US006795262B1

(12) United States Patent
Codilian et al.

(10) Patent No.: US 6,795,262 B1
(45) Date of Patent: Sep. 21, 2004

(54) METHOD OF MODIFYING ON-TRACK DECLARATION ALGORITHM OF A DISK DRIVE BASED UPON DETECTION OF EXTERNAL VIBRATION CONDITION

(75) Inventors: Raffi Codilian, Irvine, CA (US); Kent W. Gibbons, Trabuco Canyon, CA (US); Steven L. Webb, Lake Elsinore, CA (US)

(73) Assignee: Western Digital Technologies, Inc., Lake Forest, CA (US)

(*) Notice: Subject to any disclaimer, the term of this patent is extended or adjusted under 35 U.S.C. 154(b) by 298 days.

(21) Appl. No.: 10/185,970

(22) Filed: Jun. 28, 2002

(51) Int. Cl.[7] .................................................. G11B 19/04

(52) U.S. Cl. ............................. 360/60; 360/75; 360/31; 360/77.02

(58) Field of Search .............................. 360/60, 75, 31, 360/27.02, 77.04, 78.09, 78.04; 324/212, 210, 226

(56) References Cited

U.S. PATENT DOCUMENTS

| | | | | |
|---|---|---|---|---|
| 6,714,371 B1 * | 3/2004 | Codilian | ...................... | 360/60 |
| 6,714,372 B1 * | 3/2004 | Codilian et al. | .............. | 360/60 |
| 6,735,033 B1 * | 5/2004 | Codilian et al. | .............. | 360/60 |

* cited by examiner

*Primary Examiner*—Alan T. Faber
(74) *Attorney, Agent, or Firm*—Milad G. Shara, Esq.; Myers Dawes Andras & Sherman

(57) ABSTRACT

A method of expanding the on-track operational range of a disk drive based upon detection of an external vibration condition. The method involves detecting that a vibration state exists and, while the existence of the vibration state is detected, modifying the default on-track-declaration algorithm such that a data transfer operation can be completed in less time than if the default on-track-declaration algorithm was in use.

22 Claims, 17 Drawing Sheets

(COMPARE WITH FIGS. 4 AND 5)

(COMPARE WITH FIGS. 7 AND 8)

(COMPARE WITH FIGURE 11)

| WEIGHTED CONTRIBUTIONS | |
|---|---|
| PERCENT OFF-TRACK | WEIGHT MULTIPLIER |
| \|14\| to \|16\| | 10 |
| \|12\| to \|14\| | 5 |
| \|10\| to \|12\| | 1 |
| \|7\| to \|10\| | 0 |
| 0 to \|7\| | -1 |

FIG. 17

| EXAMPLE WHERE THE RUNNING ANALYSIS IS BASED ON 100 SAMPLES | | | |
|---|---|---|---|
| PERCENT OFF-TRACK | WEIGHT MULTIPLIER | DISTRIBUTION | EXTENDED |
| \|14\| to \|16\| | 10 | 5 | 50 |
| \|12\| to \|14\| | 5 | 10 | 50 |
| \|10\| to \|12\| | 1 | 20 | 20 |
| \|7\| to \|10\| | 0 | 25 | 0 |
| 0 to \|7\| | -1 | 40 | -40 |
| | | RUNNING SUM → | 80 |

FIG. 18

METHOD OF MODIFYING ON-TRACK DECLARATION ALGORITHM OF A DISK DRIVE BASED UPON DETECTION OF EXTERNAL VIBRATION CONDITION

BACKGROUND OF THE INVENTION

1. Field of the Invention

The present invention relates generally to magnetic disk drives (disk drives), and more particularly to a method of expanding the on-track operational range of a disk drive based upon detection of an external vibration condition.

2. Description of the Related Art

A Disk drive generally includes a control system that implements various on-track-declaration algorithms. Generally speaking, the goal of the conventional on-track-declaration algorithm is data reliability and data integrity. The on-track-declaration algorithms achieve these goals by enabling reading or writing only after the disk drive's transducer head has remained close to track center for some time (e.g. a specified number of servo samples) and, once reading or writing has begun, the on-track-declaration algorithms disable reading or writing if the disk drive's transducer head moves too far away from track center.

1) Typical On-Track-Declaration Algorithms

Before the data transfer begins, whether writing user data to or reading user data from a desired track, the transducer head must seek to and "settle in" to the desired track. The transducer head, however, usually overshoots the desired track. The typical control system addresses overshoot by enabling data transfer only after several successive position error signal (PES) values have fallen within certain prescribed limits, i.e. only after the transducer has remained within a so-called "arrival window" for a sufficient amount of time (servo samples). There are usually two separate arrival windows for reading and writing, a "Read Settle Window" and a "Write Settle Window" The Read Settle Window is relatively liberal since the control system can simply try to re-read the data and apply correction algorithms if it does not correctly read it the first time. The Write Settle Window, on the other hand, is relatively restrictive so that data is written to the target track with minimal risk of sliver error or of corrupting an adjacent track.

After the data transfer has begun, the typical control system stops the transfer under certain conditions. After writing has begun, for example, the typical control system immediately stops writing if the transducer head momentarily exceeds a so-called write unsafe limit ("WUS limit"). The WUS limit enhances data integrity by ensuring that data is written relatively close to track center and by protecting adjacent tracks. The foregoing on-track-declaration algorithms will be discussed in detail below after reviewing the general construction and overall operation of a disk drive.

2) An Exemplary Disk Drive and its Read/Write Elements

The on-track-declaration algorithms described above are best understood with reference to an actual disk drive.

Referring to FIG. 1, a conventional disk drive 10 has a head disk assembly (HDA) 20 including at least one disk 23, a spindle motor 22 for rapidly rotating the disk 23, and a head stack assembly (HSA) 40 that includes an actuator assembly 50 and a head gimbal assembly (HGA) (not numbered) with a transducer head 80 for reading and writing data. The HSA 40 is part of a servo control system that positions the transducer head 80 over a particular track on the disk to read or write information from that track. The HSA 40 earns its name from the fact that it generally includes a plurality of HGAs that collectively provide a vertical arrangement of heads called a "head stack." The foregoing components are generally mounted in an enclosure comprising a base 21 and a cover 24. A printed circuit board assembly (PCBA) 30 is secured to the base 21, the PCBA 30 containing suitable circuitry for communicating with a host and controlling the disk drive as is well known in the art.

FIG. 2 is a simplified representation of a magneto-resistive transducer head 80 that has two elements, namely a write element 81 and a read element 82.

Returning to FIG. 1, the industry presently prefers a "rotary" or "swing-type" actuator assembly 50 that conventionally comprises an actuator body 51 which rotates on a pivot assembly between limited positions, a coil 52 that extends from one side of the actuator body to interact with a pair of permanent magnets to form a voice coil motor (VCM), and an actuator arm 54 that extends from the opposite side of the actuator body to support the HGA.

3) The Servo Control System

A disk drive is ultimately used to store user data in one or more "data tracks" that are most commonly arranged as a plurality of concentric data tracks on the surface of its disk or disks. Special servo information is factory-recorded on at least one disk surface so that the disk drive's servo control system may control the actuator assembly 50, via the VCM, to accurately position the transducer head to read or write user data to or from the data tracks. The servo information permits the servo control system to repeatedly determine the position of the head relative to the written track. In operation, the disk drive's servo control system intermittently processes (read only) the pre-recorded servo information while the actuator assembly 50 moves the head to a desired track and, once there, while the disk drive transfers user data to the data track (i.e. writing) or from the data track (i.e. reading).

4) On-Track Declaration Algorithms for READ READY or WRITE READY

FIG. 3A is a position profile 85 (position versus time) of a transducer head being positioned for subsequent execution of a read or write operation. In FIG. 3A, the seek moves the head from a current track X to a target track Y. As shown, the position profile 85 extends through a seek period 91 during which time the head travels across one or more tracks, into a subsequent read settle period 92 or write settle period 93 during which time the head "settles in" to the TARGET TRACK CENTER of the target track Y.

FIG. 3B is a graphical representation of the total time it takes to complete a data transfer command in the presence of a vibration state when using a default on-track declaration algorithm. As shown, the time is consumed by the seek time, the settle time, and the actual writing time. In this particular example, it is further shown that the writing is intermittently interrupted due to the existence of the vibration state, thereby extending the overall time to complete the data transfer command.

FIG. 4 is a close-up of the position profile 85 of FIG. 3A, illustrating the "settling in" that occurs during the read settle period 91 or write settle period 93. Here, the servo control system attempts to align the transducer head to the TARGET TRACK CENTER within a read settle window 94 (+R percent from track center) or within a write settle window 95 (+W percent from track center) prior to execution of a read or write command. The read and write settle windows 94, 95 are sometimes called "arrival windows." A write operation is more critical than a read operation due to the potential of overwriting and corrupting data on an adjacent track. Accordingly, the settle criteria for execution of a write operation is generally more conservative than the settle criteria for execution of a read operation (i.e. W<R).

The servo system works to bring the transducer head into alignment with TARGET TRACK CENTER during the settling period. Since the transducer head may overshoot TARGET TRACK CENTER at the beginning of the settling period, it is necessary to successively sample the position of the transducer head relative to TARGET TRACK CENTER before starting to execute the read or write operation. Position samples of transducer head relative to TARGET TRACK CENTER are taken by the disk drive servo system at regular time intervals, indicated at T1, T2, T3, T4, T5, T6, T7, T8, T9 and T10. The corresponding samples on position profile 85 are indicated as S1, S2, S3, S4, S5, S6, S7, S8, S9, and S10.

FIG. 4 shows a simple embodiment where a single window parameter is used (i.e. R percent or W percent). In such case, if a predetermined number of consecutive samples (e.g. two for read and three for write) fall within the desired READ SETTLE WINDOW 94 or WRITE SETTLE WINDOW 95, then the servo processor 38 will determine "READ READY" or "WRITE READY". The servo control system, in other words, will declare that the transducer head is acceptably close to the TARGET TRACK CENTER to affect the data transfer operation. For the seek operation shown in FIG. 4, the transducer head is READ READY after sample S2 since two consecutive samples S1 and S2 fall within the READ SETTLE WINDOW 94. The transducer head is WRITE READY at the time of sample S10, since it is positioned within the WRITE SETTLE WINDOW 95 for three consecutive samples S8, S9, and S10. In actual use, the number of servo samples that must fall within the WRITE SETTLE WINDOW 95 is usually more than three, but the precise number is not relevant to understanding this invention.

The foregoing on-track-declaration algorithm does not perform well when the disk drive is subjected to a vibration state that is initiated by an external vibration excitation. FIG. 5, for example, shows how a VIBRATION STATE causes the transducer head to continually swing back and forth beyond the WRITE SETTLE WINDOW 95. With worst case timing, as shown, the servo control system will not declare a WRITE READY condition since no three successive samples fall within the WRITE SETTLE WINDOW 95. A delay of this nature for each and every write command will detrimentally affect drive performance.

FIG. 6 shows a more complex embodiment that places a heavier emphasis on an accurate WRITE READY condition for enhanced data reliability. Here, three window parameters are used to define a ZONED WRITE SETTLE WINDOW 195 having three zones: (1) a near zone 191; (2) a neutral zone 192; and (3) a far zone 193. The near zone 191 extends from the TARGET TRACK CENTER to 10% off track. The neutral zone 192 extends from 10% off track to 13% off track. The far zone 193 extends from 13% off track to 16% off track. In this embodiment, the control system accords each of the zones a "weight" as follows:

| Arrival Zone | Off-Center Percentage | Contribution |
|---|---|---|
| near zone 191 | <\|10%\| | −1 |
| neutral zone 192 | \|10%\| to \|13%\| | 0 |
| Far zone 193 | \|13%\| to \|16%\| | +1 |

In operation, the servo control system declares WRITE READY once a successive number of servo samples accumulate a total score of −7. In FIG. 6, the transducer head is WRITE READY at the time of sample S20, since the accumulated score reached −7 while the head remained within the ZONED WRITE SETTLE WINDOW 195 for at least seven successive samples, in this case for the ten samples from sample S10 through sample S19.

The more complex on-track-declaration algorithm also does not do particularly well when the disk drive is being subject to a vibration state that is initiated by an external vibration excitation. FIG. 7, for example, shows how a VIBRATION STATE #1 causes the transducer head to continually swing back and forth from one neutral zone 192 to the other neutral zone 192. The default on-track-declaration algorithm based on the ZONED WRITE SETTLING WINDOW 195 will eventually result in a score of −7 under these conditions, but as shown, the attainment of that score will take significantly longer in the presence of the VIBRATION STATE #1 (here, the score has only reached −5 by sample S20). A delay of this nature for each and every write command will detrimentally affect drive performance.

FIG. 8 shows a slightly worse VIBRATION STATE #2 that causes the transducer head to continually swing back and form from one far zone 193 to the other far zone 193. Under these circumstances, the default on-track-declaration algorithm based on the ZONED WRITE SETTLING WINDOW 195 will never reach a score of −7 and the drive will effectively be in a complete failure mode.

5) On-Track Declaration Algorithms for READ STOP or WRITE STOP

As noted above, even after the disk drive is executing a read or write command and transferring data to or from the disk, the servo control system continues to monitor the position of the transducer head during that process and, if appropriate, de-asserts the READ READY or WRITE READY gate.

The write unsafe limit, or WUS limit, relates to circumstances under which the control system will terminate writing as a function of the oscillatory deviations of the write element's path 501 relative to track center (T/C). The WUS limit, to put it another way, corresponds to the write element's maximum permissible off-track distance before writing is disabled. The WUS limit is usually specified in terms of a percentage track pitch from track center T/C (e.g.±16%).

While writing, the write element 81 may unintentionally deviate from track center due to resonant excitations that produce damped oscillations (initiated, for example, by VCM movements or from a shock event) or, of relevance to this invention, due to external vibration excitations that produce steady-state oscillations (initiated, for example, by nearby components or environmental vibration). In either case, and without regard to the reason for the excursion, the disk drive's servo control system immediately stops writing upon detecting that the write element 81 has moved beyond the WUS limit.

The tighter the WUS limit, the more frequently that the control system will prematurely stop writing and have to make another pass to try and write the same user data. A higher frequency of disabling writing will reduce the performance of the drive.

FIGS. 9 and 10 are data path diagrams that explain why a WUS limit has been used to date and why it is generally set to a small, "narrow" or "tight" value. FIGS. 9 and 10 show hypothetical data paths 501 and 502 of a write element 81 after the servo control system has successfully moved the write element 81 to the desired track in a track seek mode and then entered a track following mode.

In FIG. 9, the write element's hypothetical excursions from track center T/C are signified by vertical arrows, varying from +5%, to −10%, to +15%, to −14%, to +5%, to −3%. In this particular case, none of the excursions exceed the WUS limit and writing continues without hindrance.

In FIG. 10, however, the write element's hypothetical excursions from track center T/C are signified by vertical arrows, varying from +5%, to −10%, to +18% (!!!), to −14%, to +5%, to −3%. In FIG. 10, with the WUS limit set to 16%, writing is disabled just prior to the 18% excursion to protect the user data in the adjacent track. Assuming that the 18% excursion was the result of a one-time shock event, or the like, then the control system will complete the write command by writing the user data to the disk at the next available opportunity.

The foregoing on-track-declaration algorithms that use a static WUS limit do not perform well when the disk drive is subjected to a vibration state that is initiated by an external vibration force. FIG. 11, for example, shows how a hypothetical VIBRATION STATE causes the transducer head to continually swing back and forth from +18% to −18% such that the WUS limit is repeatedly exceeded and write commands, assuming they ever started, are never completed. A disk drive trying to write in a vibration environment of this nature will simply fail to operate.

6) Overall Observations re the Default Algorithms

A restrictive "arrival window" increases data reliability by waiting longer for the transducer head to settle in to a tight track follow before the disk drive begins to write the data. A tight WUS limit, likewise, constantly makes sure that the transducer head does not stray too far from the track center of the track being written in order to avoid sliver errors and to prevent corruption of the previously written data of an adjacent track.

Data reliability and data integrity are obviously very laudable goals when it comes to storing and retrieving user data. The default on-track-declaration algorithms normally serve their intended purposes with respect to achieving such goals. As such, the default on-track-declaration algorithms are generally regarded as assets. These same on-track-declaration algorithms may become liabilities, however, if the disk drive is attempting to operate in the presence of a vibration state. In particular, a vibration state may cause the transducer head to move slightly beyond the WRITE SETTLE WINDOW for one or more of the successive samples or cause the transducer head to momentarily or repeatedly cross beyond the WUS limit. If the data could still be written and later retrieved even in the face of the vibration sate, then it would be best of course if the data transfer still took place. Under such circumstances, however, the default on-track-declaration algorithms unnecessarily preclude the data transfer operation from starting or unnecessarily interrupt the data transfer operation before it is finished. A drive that constantly fails to transfer data in the presence of a vibration environment, when it could in fact transfer such data, is not performing at its maximum capability. It is desirable, of course, to obtain every possible element of drive performance in the highly competitive disk drive market.

There remains a need, therefore, for a method of expanding the on-track operational range of a disk drive in order to permit data transfers that otherwise would not occur in the presence of a vibration state.

SUMMARY OF INVENTION

The invention may be regarded as a method of expanding an on-track operational range of a disk drive that is subject to being in a vibration state that is initiated by an external vibration force. The subject disk drive comprises a control system, the control system is using a default on-track-declaration algorithm for analyzing servo samples and determining whether or not a data transfer operation is warranted. The method comprises the steps of detecting that the vibration state exists and modifying the default on-track-declaration algorithm while the existence of the vibration state is detected. As suggested by comparing FIG. 3C with FIG. 3B, the method may also comprise completing the data transfer operation in less time than if the default on-track-declaration algorithm was in use. The method may, for example, relax the off-center percentages that define the write settle window or the write unsafe (WUS) limit.

In a more specific context, the detecting step is accomplished by indirectly detecting that the vibration state exists by monitoring a control system parameter such as the PES or off-track percentage, the raw error rate experienced during read operations, the frequency of ECC correction, and so on.

BRIEF DESCRIPTION OF THE DRAWINGS

The just summarized invention may best be understood with reference to the Figures of which:

FIG. 17 is a table showing the preferred weights that are used as multipliers for producing a running sum that, when it surpasses an established vibration threshold, indicates that a vibration state exists;

FIG. 18 is an example of a situation where 100 servo samples are used to produce the running sum

DETAILED DESCRIPTION OF THE PREFERRED EMBODIMENT

This application is directed to an innovative method of expanding the on-track operational range of a disk drive by modifying a default on-track-declaration algorithm based on the detection of a vibration state that is initiated by an external vibration force or excitation. The method is practiced in a disk drive that include a servo control system that implements an on-track-declaration algorithm for analyzing servo samples and determining whether or not a data transfer operation is warranted. As explained in the background above, the conventional on-track-declaration algorithms involve parameters that are set at fixed or static levels. The algorithms and related parameters remain fixed regardless of whether or not the drive is operation in a vibration environment that subjects the drive to vibratory forces of a steady-state nature.

A fixed on-track-declaration algorithm based on fixed parameters performs reasonably well with resonant excitations that produce damped oscillations that drop in amplitude over time (initiated, for example, by VCM movements or from a shock event). As shown in FIGS. 5, 7, 8 and 11, however, the fixed approach does not perform well in the face external vibration excitations that produce steady-state oscillations (initiated, for example, by nearby components or environmental vibration).

Figure 12:
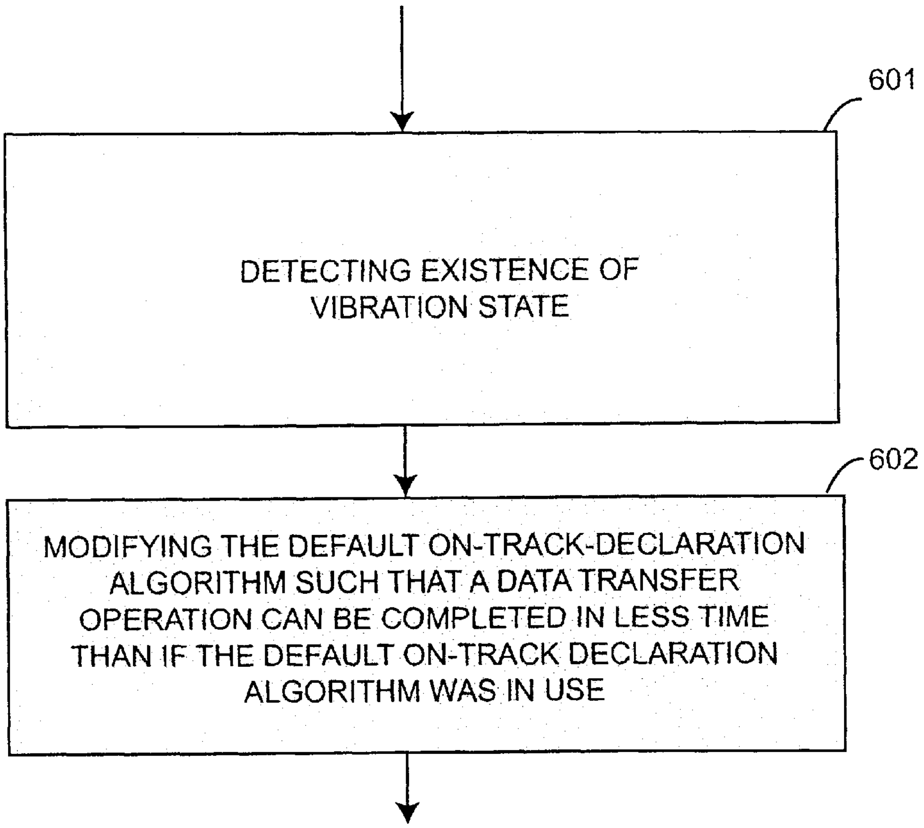
FIG. 12 is a flowchart that broadly illustrates the herein described method including the step of detecting a vibration state and the step of modifying an on-track-declaration algorithm.

FIG. 12 is a flowchart that broadly illustrates the herein described method. As shown, the method involves two main steps: (1) detecting that a vibration state exists and while the existence of the vibration state is detected; (2) modifying the default on-track-declaration algorithm such that a data transfer operation can be completed in less time than if the default on-track-declaration algorithm was in use. The detecting step is identified by reference number 601 and the modifying step is identified by reference number 602.

Any number of alternative methods may be used to implement step 601, i.e. to detect that a vibration state exists. Accordingly, the method is best understood by first describing several possible embodiments for the modifying step, step 602, that takes place when a vibration state is detected, and then returning to several methods of detecting that the vibration state exists.

The Modifying Step

The modifying step is generally directed to modifying a default on-track declaration algorithm that is directed to effecting a data transfer operation. The data transfer operation can, of course, be a read-related algorithm that relates to a read operation or a write-related algorithm that relates to a write operation. The method is most useful, however, in the context of a write-related algorithm as they tend to be more conservative then their read-related counterparts. The write-related algorithms, in other words, offer more opportunity for modification.

The presently preferred embodiments of the modifying step will be described with reference to the default examples that are described above and illustrated in FIGS. 4–11.

Figure 1:
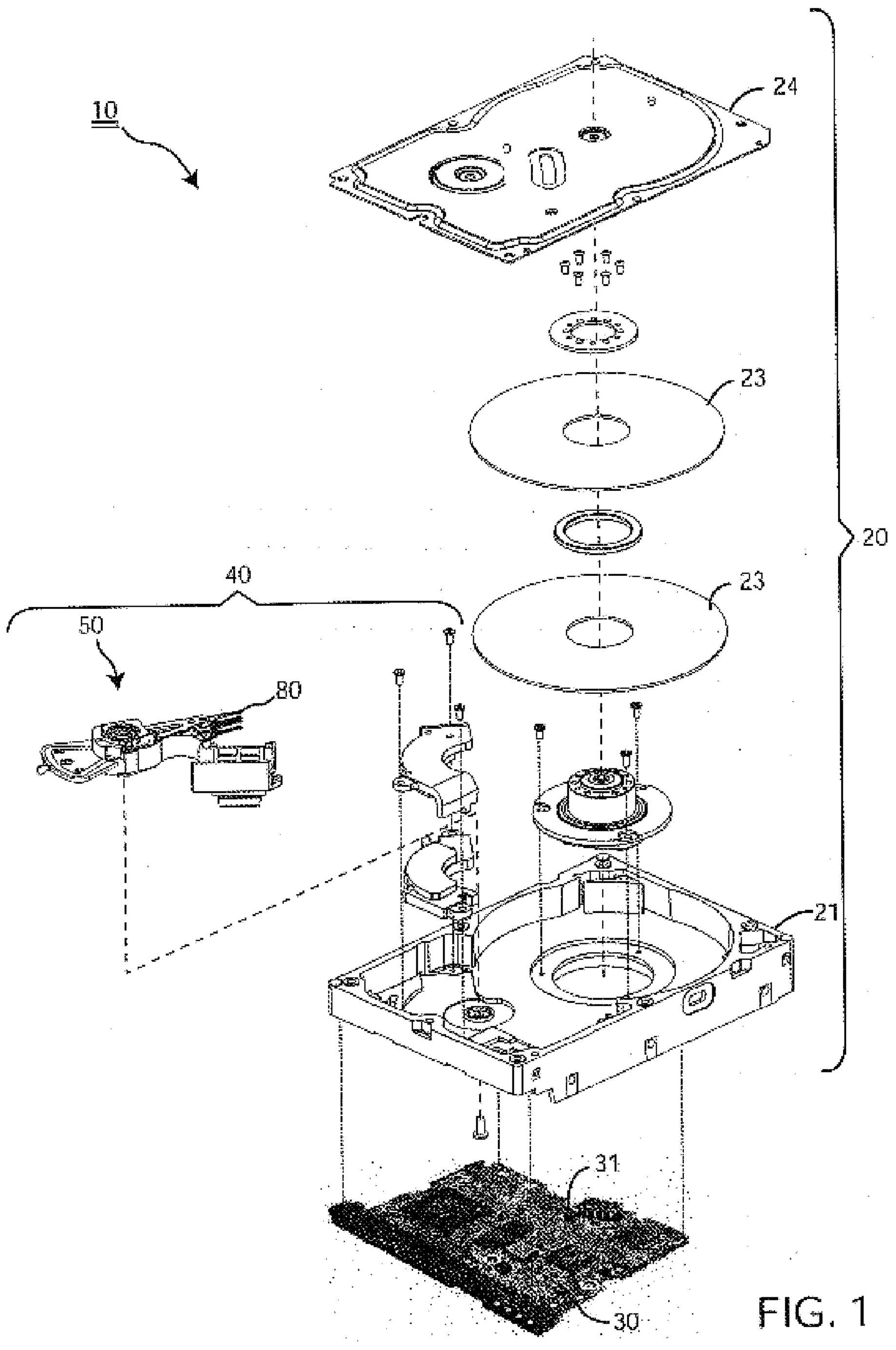
FIG. 1 is an exploded perspective view of a magnetic disk drive 10 having a head disk assembly 20 ("HDA") including a head stack assembly 40 ("HSA") which carries a transducer 80 over concentric data tracks and associated servo bursts on the surface of a disk 23.
Figure 2:
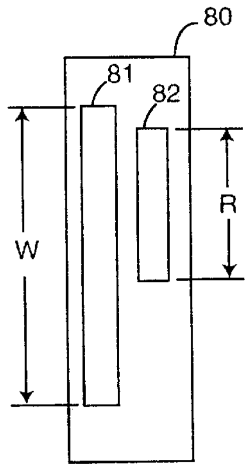
FIG. 2 is a simplified representation of a magneto-resistive transducer head 80 that has two elements, namely a write element 81 and a read element 82.
Figure 3A:
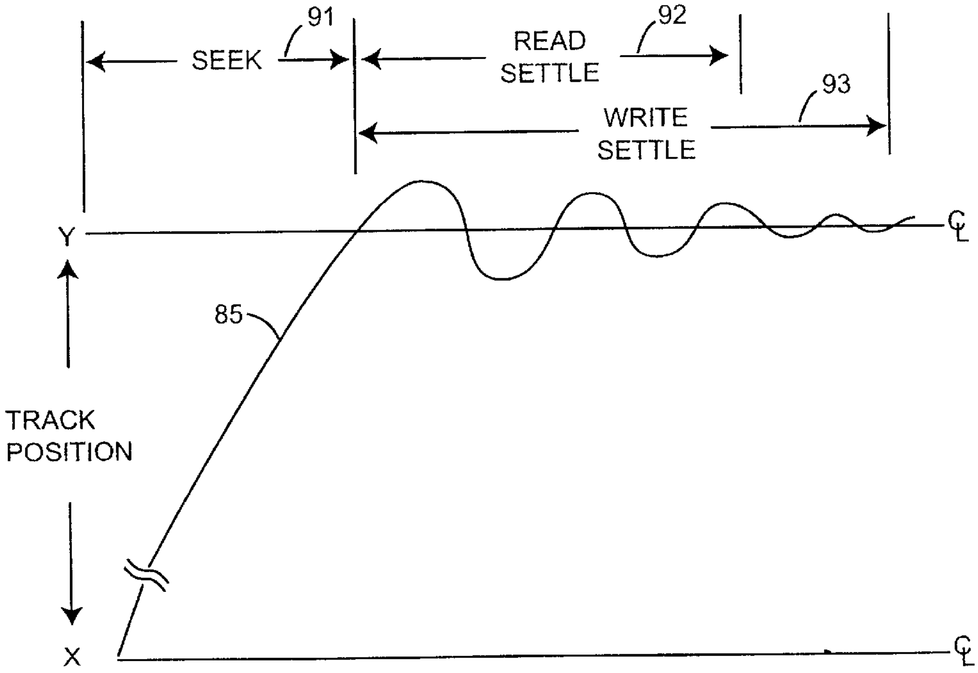
FIG. 3A is a graphical representation of a typical seek operation for positioning a head from current track X to a target track Y, for execution of a read or write command.
Figure 3B:
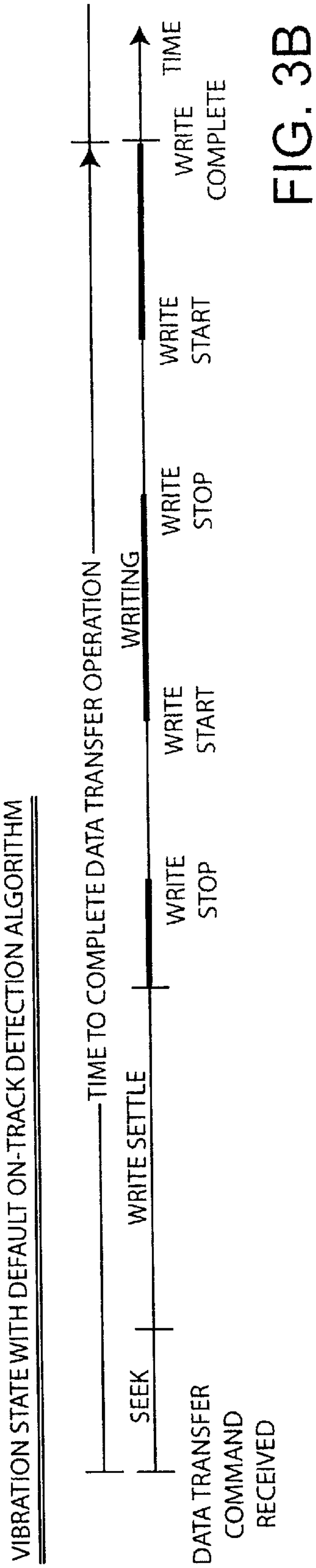
FIG. 3B is a graphical representation of the total time it takes to complete a data transfer command in the presence of a vibration state when using a default on-track declaration algorithm.
Figure 3C:
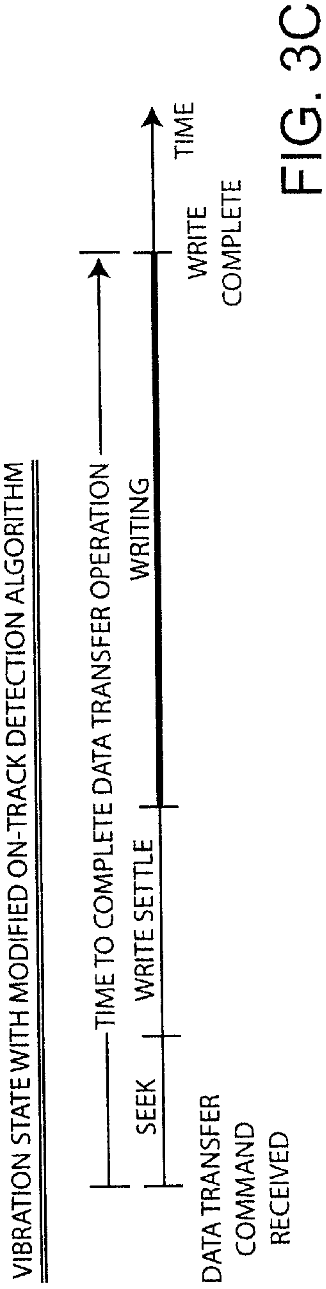
FIG. 3C is a graphical representation of how it takes less time to complete a data transfer command in the presence of a vibration state when using a modified on-track declaration algorithm according to a preferred embodiment of this invention.
Figure 4:
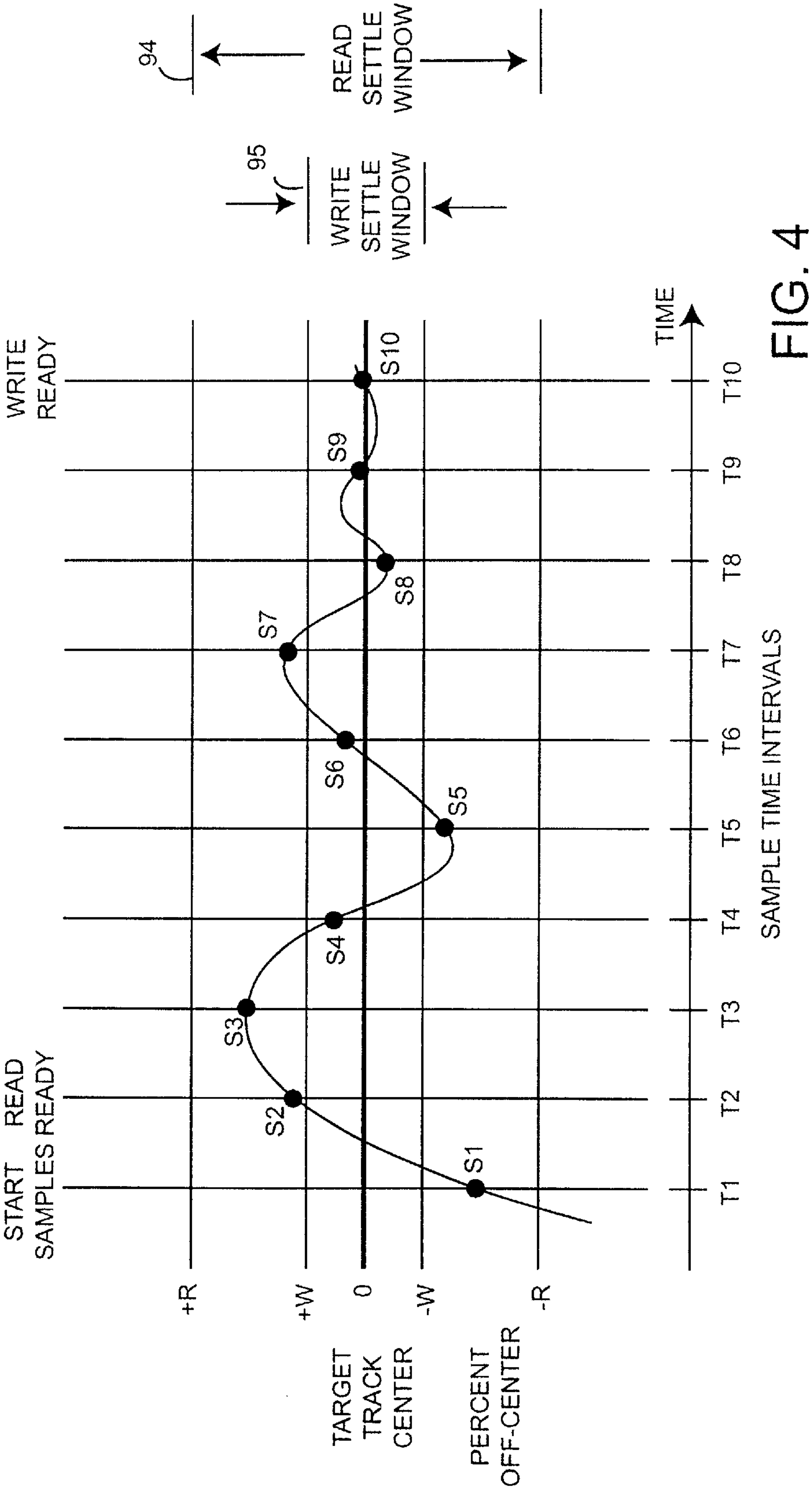
FIG. 4 is a close-up diagram illustrating the "settle in" portions of the seek operation including and positioning and alignment of a disk drive head for three successive samples within a fixed-width READ SETTLE WINDOW 94 (+R percent from track center) or a fixed-width WRITE SETTLE WINDOW 95 (+W percent from track center) for execution of a read or write command.
Figure 5:
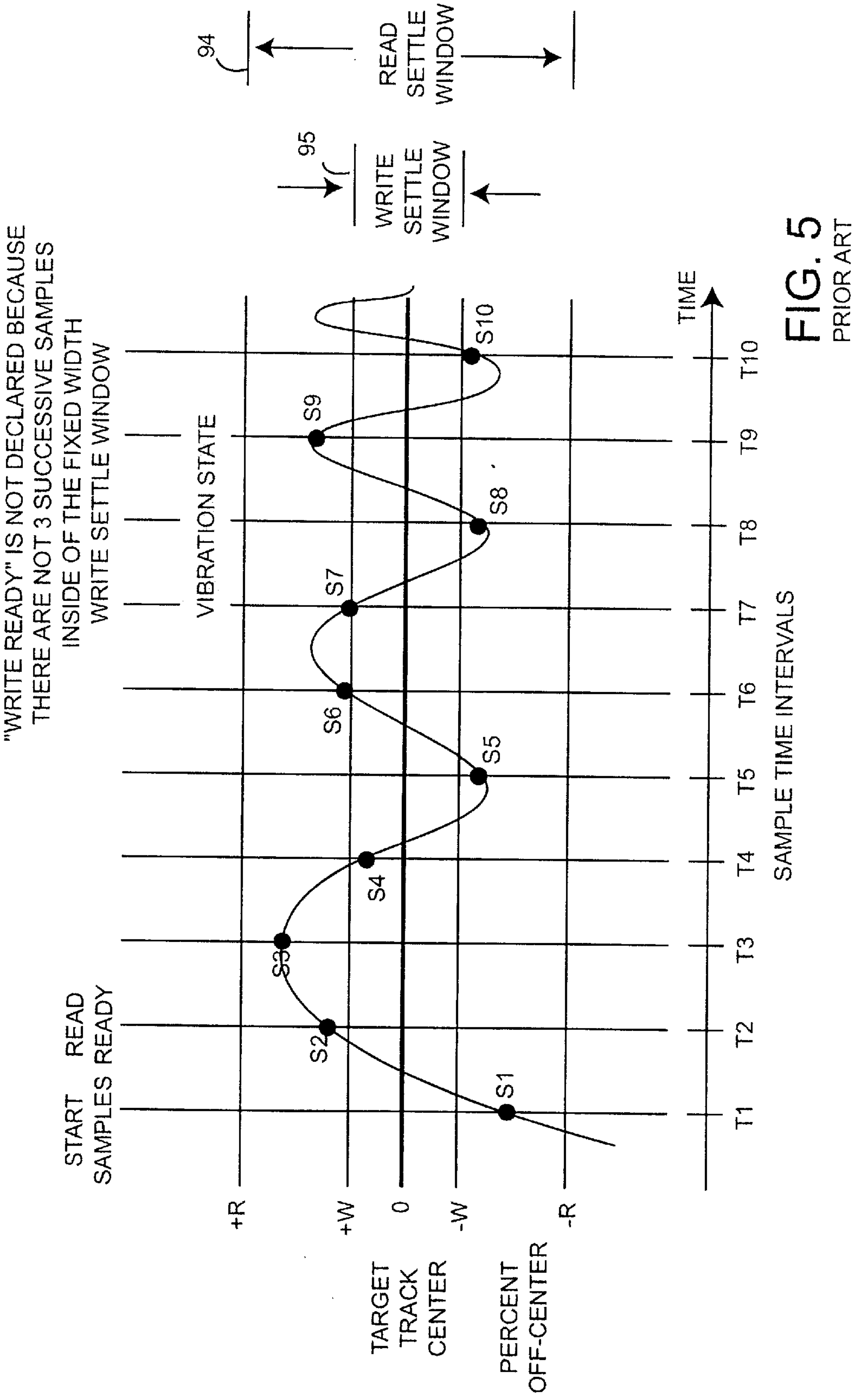
FIG. 5 shows how a VIBRATION STATE may cause the transducer head to continually swing back and forth from just beyond one side of the fixed-width WRITE SETTLE WINDOW to just beyond the other side, such that the attainment of a WRITE READY state may be impossible or delayed.
Figure 6:
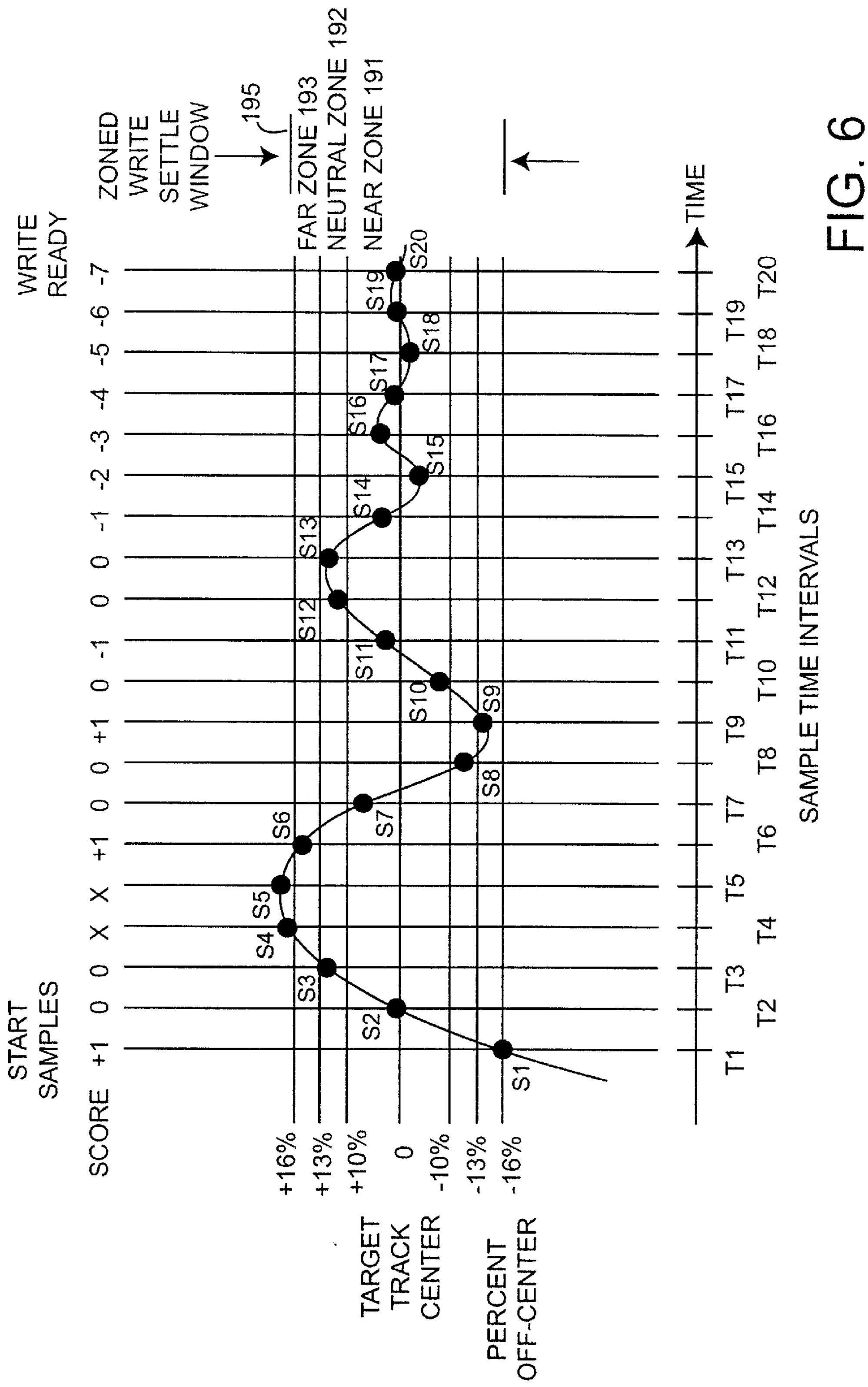
FIG. 6 shows a more complex embodiment where three percentage parameters are used to define a ZONED WRITE SETTLE WINDOW 195 having three fixed zones, including a near zone, a neutral zone, and a far zone.
Figure 13:
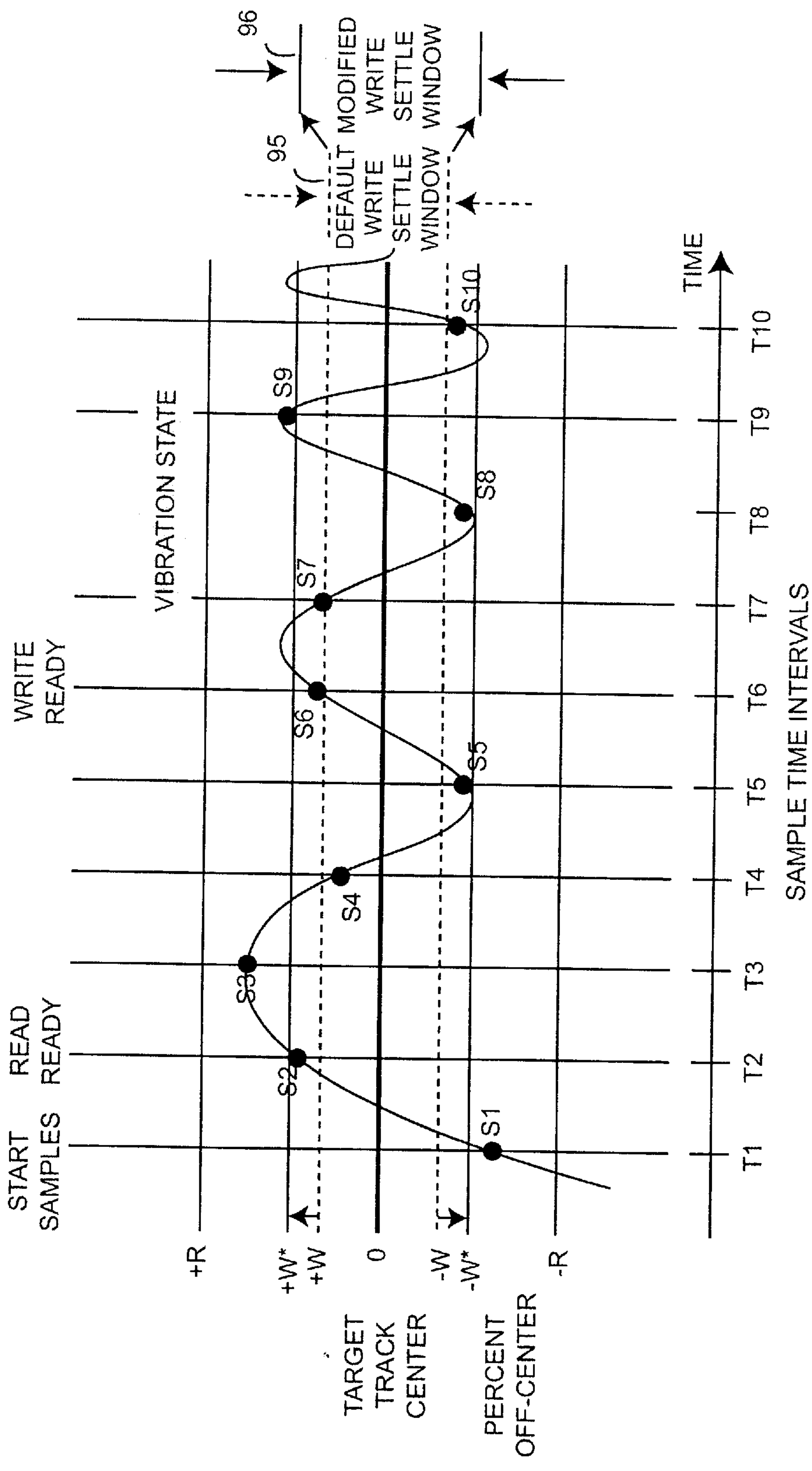
FIG. 13 illustrates a first embodiment of the modifying step.

FIG. 13 illustrates a first embodiment of the modifying step, for example, relates to FIG. 5 where a READ SETTLE WINDOW 94 and a WRITE SETTLE WINDOW 95 are ordinarily defined by fixed off-center values R and W, respectively. The off-center windows of FIG. 5 are fixed. FIG. 13, by contrast, shows that when a VIBRATION STATE is detected, the method modifies the WRITE SETTLE WINDOW 95 to produce a MODIFIED WRITE SETTLE WINDOW 96 that is intentionally more liberal. The DEFAULT WRITE SETTLE WINDOW 95 uses an off-track percentage of W, whereas the MODIFIED WRITE SETTLE WINDOW 96 uses an off-track percentage of W*. As shown in FIG. 13, the MODIFIED WRITE SETTLE WINDOW 96 beneficially permits the control system to declare a WRITE READY state at the time of sample S6. In essence, the method expands the write settle window so that the disk drive can complete the data transfer process in the face of the VIBRATION STATE.

Figure 7:
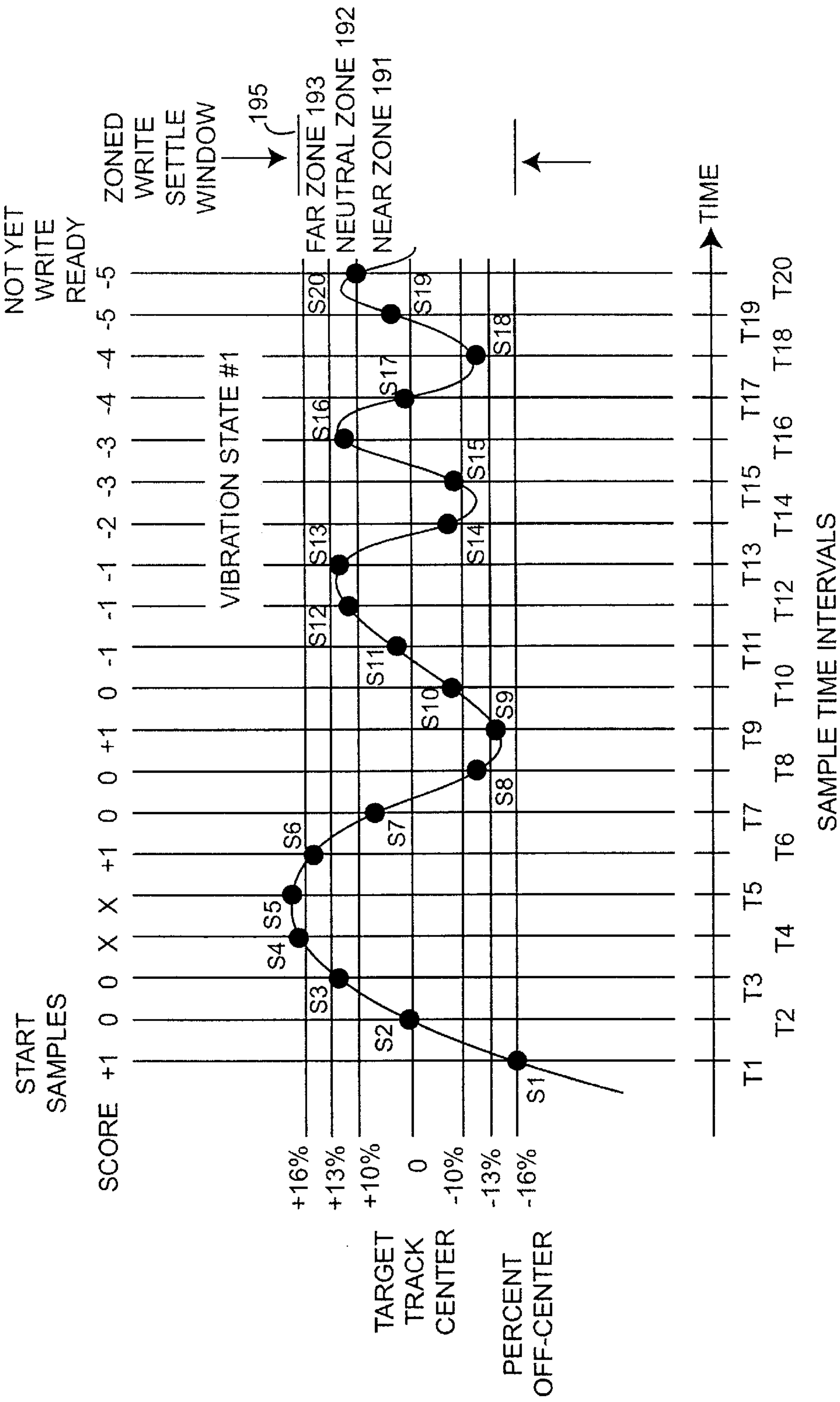
FIG. 7 shows how a VIBRATION STATE #1 causes the transducer head to continually swing back and forth from one neutral zone 192 to the other neutral zone 192 such that the attainment of a WRITE READY state, while still possible, is significantly delayed.
Figure 8:
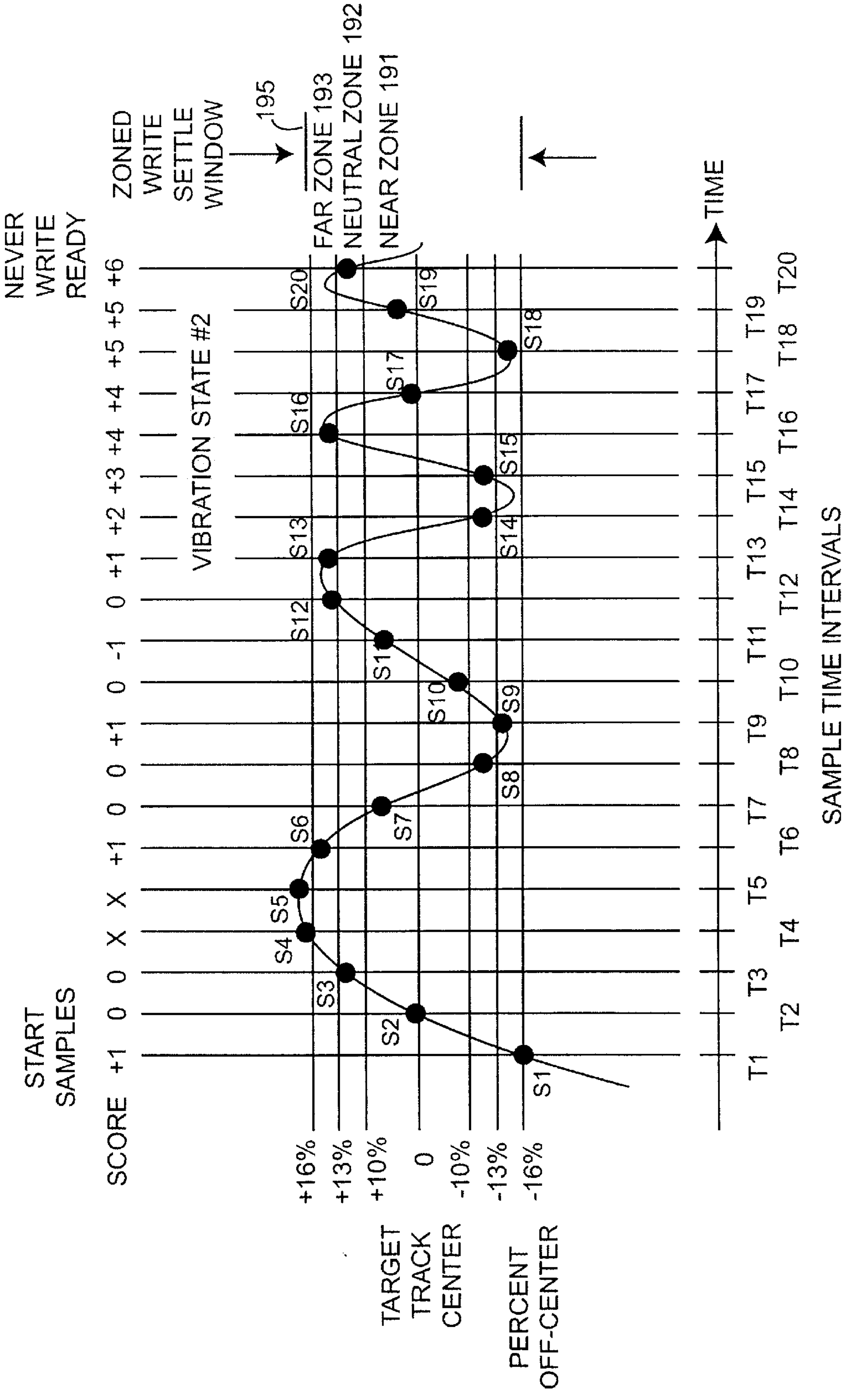
FIG. 8 shows a slightly worse VIBRATION STATE #2 causes the transducer head to continually swing back and form from one far zone 193 to the other far zone 193 such that the attainment of a WRITE READY state is completely precluded.
Figure 9:
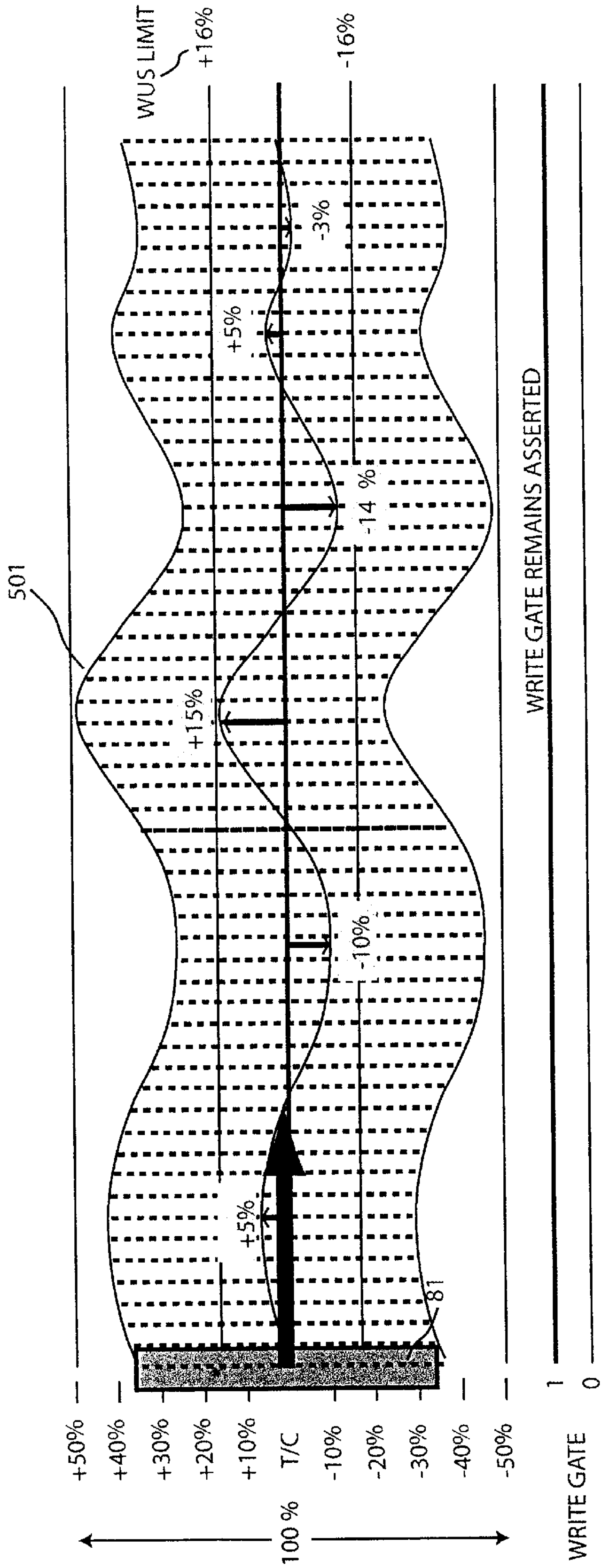
FIG. 9 illustrates a hypothetical data path 501 of a write element 81 relative to track center where the control system continues to assert the WRITE READY gate since the write element's excursions from track center are less than the write unsafe limit (WUS limit)
Figure 10:
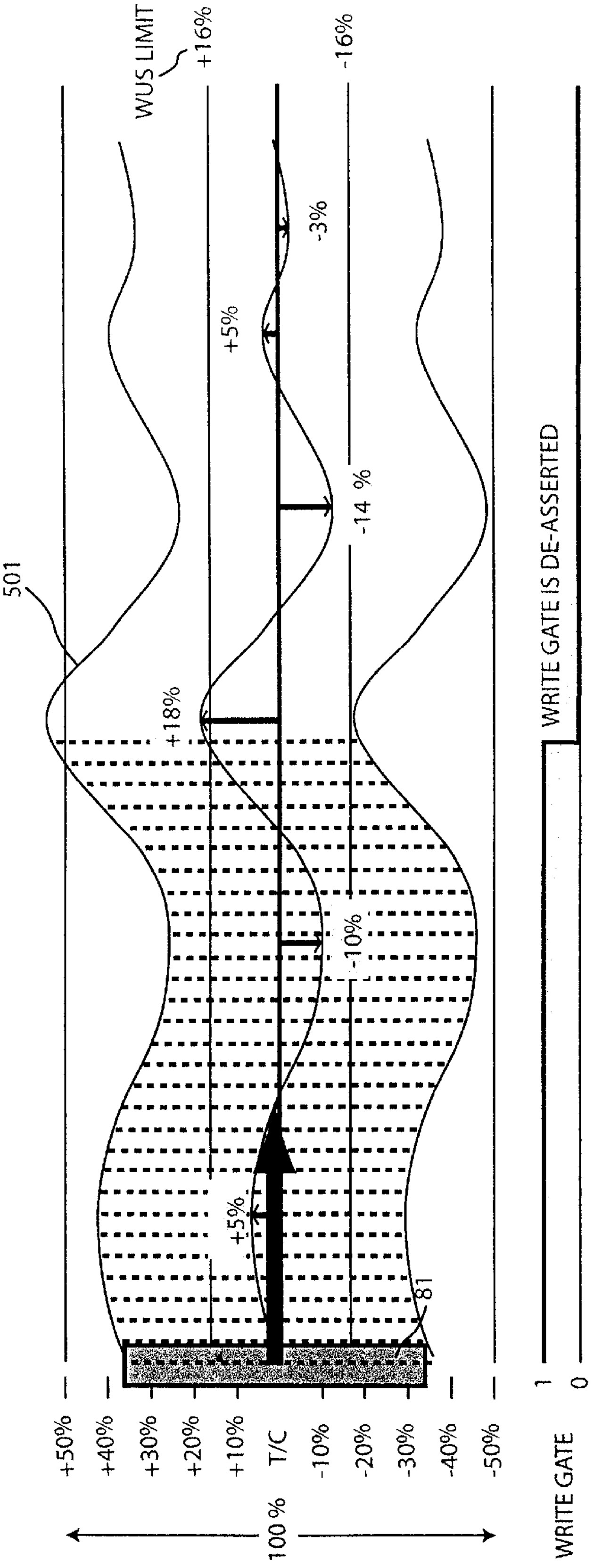
FIG. 10 illustrates a hypothetical data path 501 of a write element 81 relative to track center where the control system de-asserts the WRITE READY gate when one of the write element's excursions from track center exceeds the WUS limit.
Figure 14:
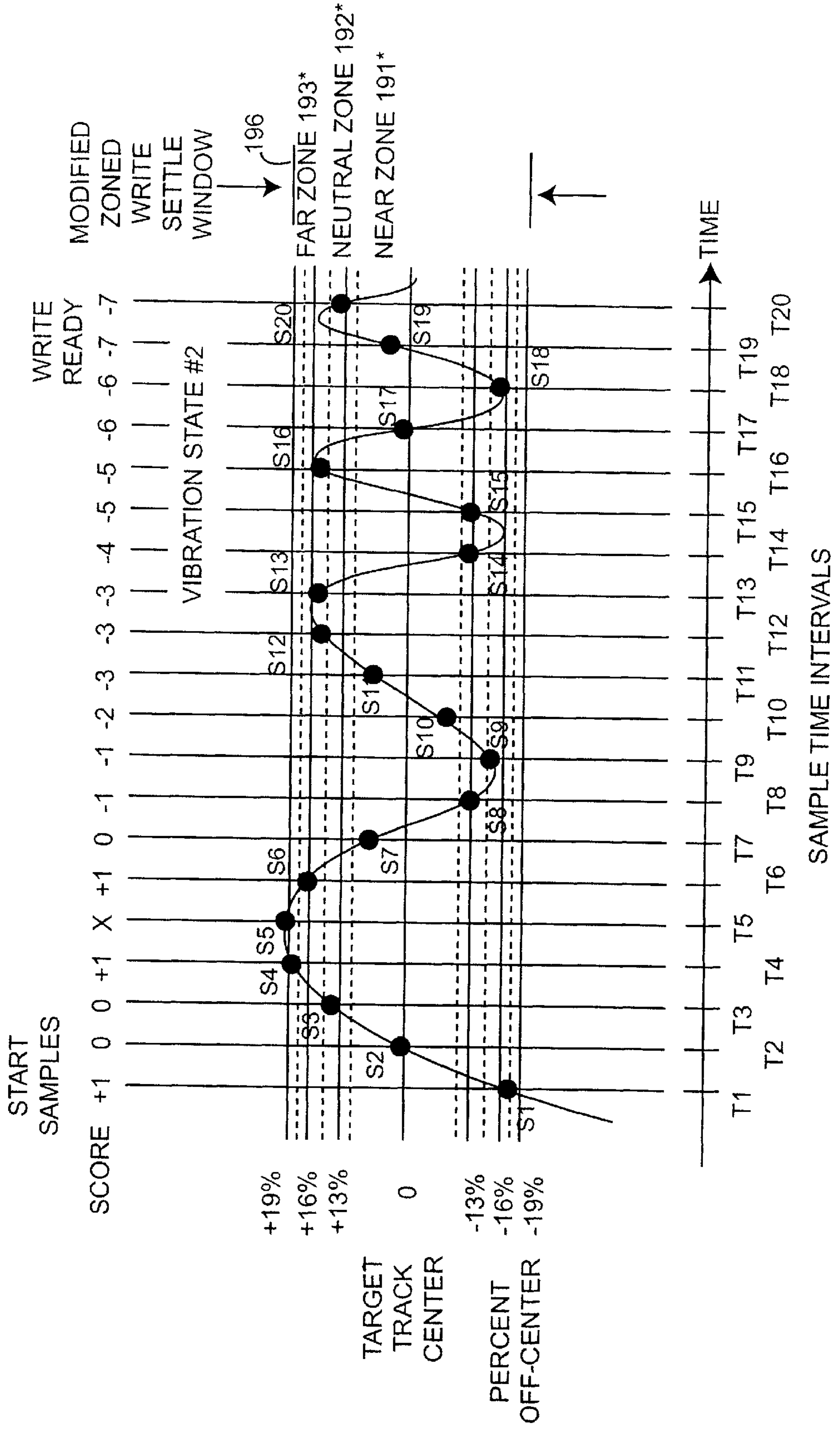
FIG. 14 illustrates a second embodiment of the modifying step.

FIG. 14 illustrates a second embodiment of the modifying step that relates to FIGS. 7 and 8 where a ZONED WRITE SETTLE WINDOW 195 is ordinarily defined by three fixed off-center percentages: 10%, 13%, and 16%, to form a near zone 191, a neutral zone 192, and a far zone 193. In FIG. 14, while a vibration state exists, the method modifies the parameters of the default on-track-declaration algorithm such that the three off-center percentages are 13%, 16%, and 19%. As a result, the method produces a MODIFIED ZONED WRITE SETTLE WINDOW 196 that permits the disk drive to declare WRITE READY at the time of sample S19, rather than never at all.

Figure 11:
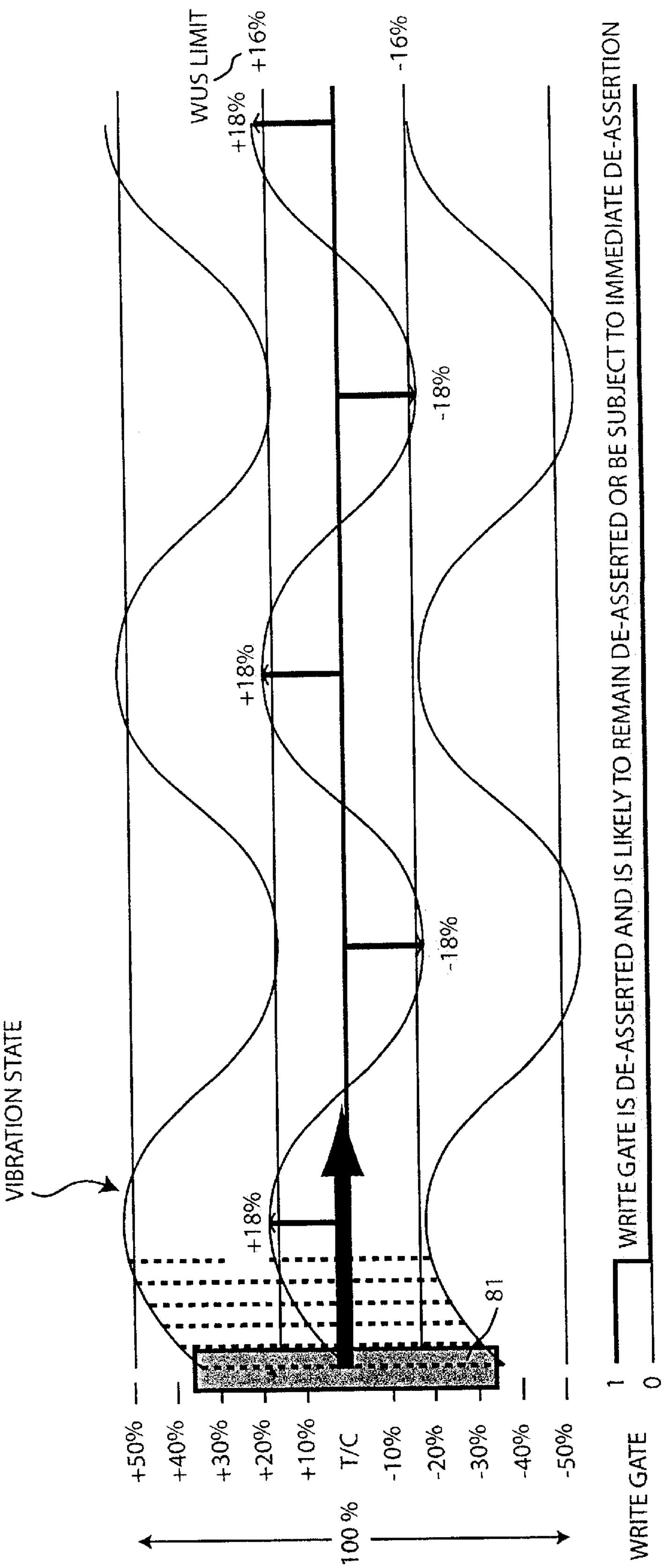
FIG. 11 illustrates a hypothetical data path 501 of a write element 81 relative to track center where the control system, in the presence of a vibration state, de-asserts the WRITE READY gate and is likely to repeatedly de-assert it on each and every subsequent write attempt.
Figure 15:
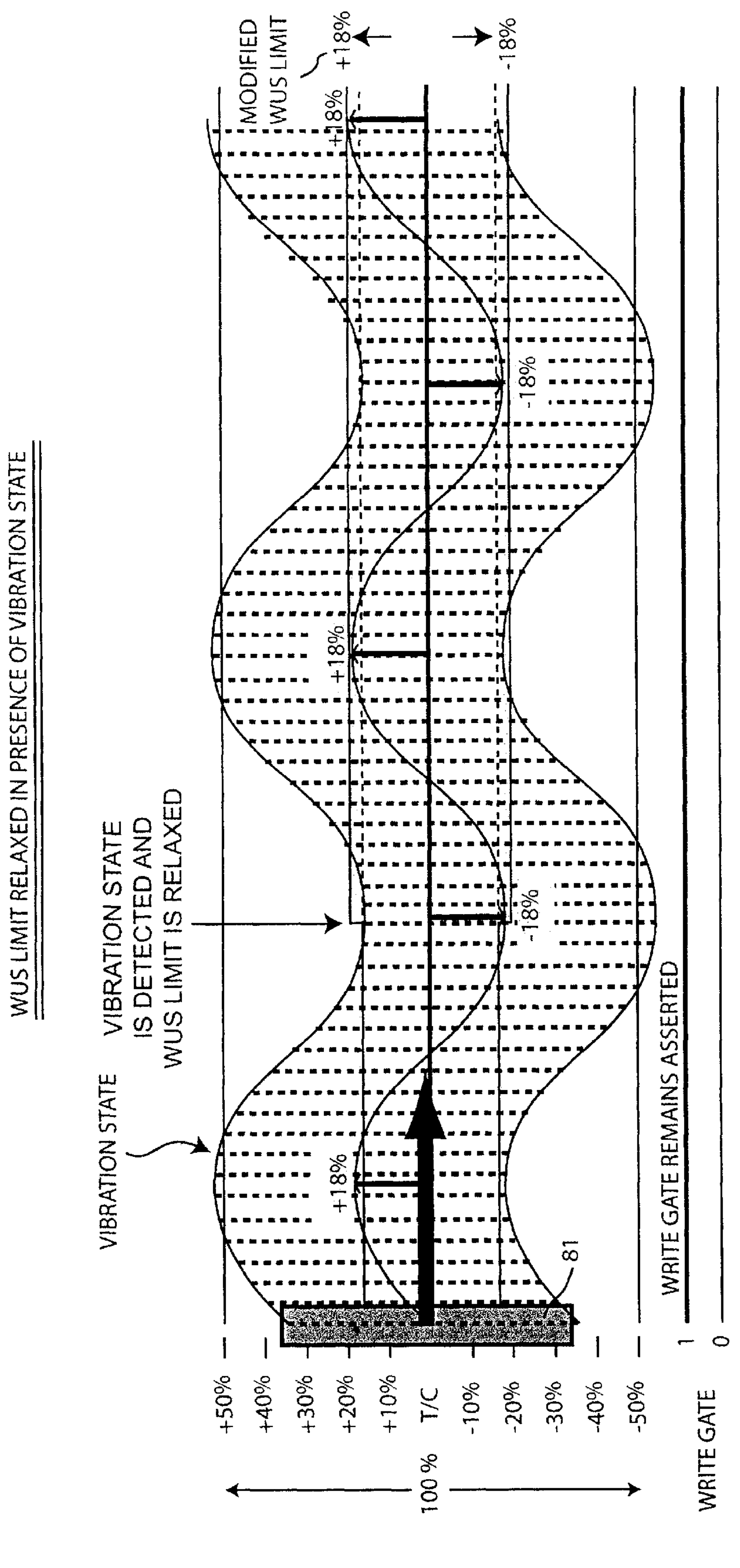
FIG. 15 illustrates a third embodiment of the modifying step.

FIG. 15 illustrates a third embodiment that relates to FIG. 11. Here, the default on-track-declaration algorithm involves a WUS limit that is specified in terms of an off-center percentage that when exceeded in any one servo sample indicates that writing should stop. In the prior art case of FIG. 11, where the WUS limit parameter is set to a fixed value of 16% off-center, and where the disk drive is subjected to a vibration force that causes the transducer head to swing back and forth from +18% to −18%, the WRITE GATE is de-asserted early on and is likely to remain de-asserted or be subject to nearly immediate de-assertion should the drive encounter conditions that permit it to try writing again.

In FIG. 15, having detected that a vibration state exists, the subsequent modifying step expands the WUS limit from 16% to 18% such that the writing specified by the write command may efficiently continue with fewer or no intermittent pauses.

Many alternative embodiments of the modifying step 602 are possible. The modification may be directed to modifying the overall approach of the on-track-declaration algorithm (switching from a unitary window to a zoned window for example) or more discretely by simply modifying one or more on-track-declaration parameters (e.g. the WUS limit).

The Detecting Step

As noted at step 601 of FIG. 12, the method includes the step of detecting that a vibration state exists. This step can be accomplished by directly monitoring a sensor or by indirectly detecting by monitoring data that is available to the disk drive's control system.

As to directly detecting a vibration state by monitoring a sensor, the preferred sensor is an accelerometer 31 that is mounted to the drive's PCBA 30. Various type of accelerometers may be used and a detailed description of their operation and interface requirements is unnecessary for a full understanding of this invention.

As to indirectly detecting a vibration state by monitoring data that is available to the disk drive's control system, there are numerous options. The preferred approach involves the sub-steps of monitoring a control system metric over a running period of time and determining that a vibration state exists based on the monitored control system metric. The monitored data would include control system metrics such as, for example, the PES or off-center percentage, the raw error rate experienced during read operations, the frequency of ECC correction, and so on. In the preferred embodiment, the method determines that a vibration state exists if a value associated with one or more of the monitored control system metrics exceeds a pre-determined threshold value.

Figure 16:
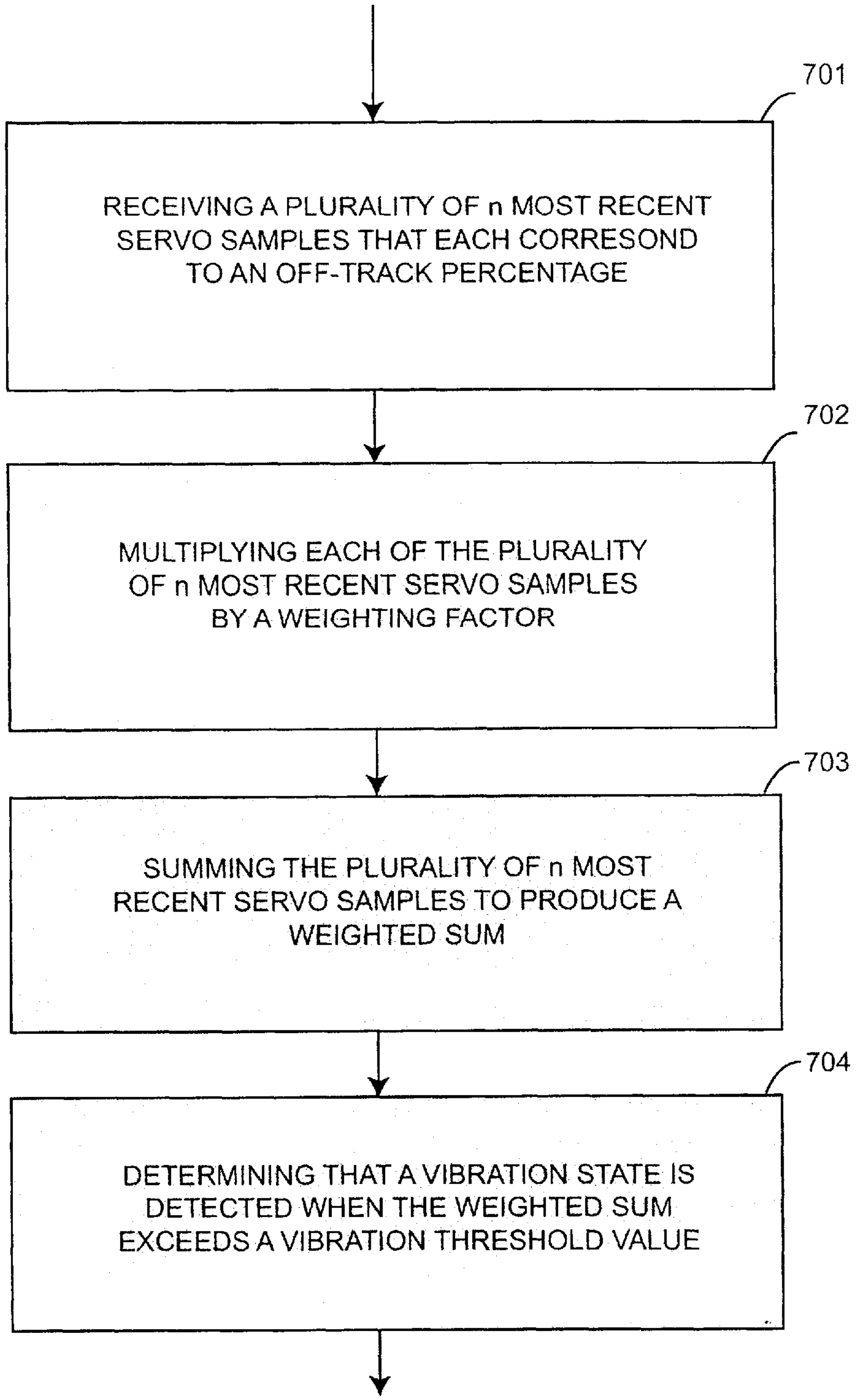
FIG. 16 is a flowchart that broadly illustrates a preferred approach to implementing the vibration state detecting step.

FIG. 16 is a flow chart that illustrates a presently preferred method of indirectly detecting a vibration state. Here, the detecting step is accomplished by receiving a set of n most recent contiguous servo samples that each correspond to an off-center percentage (step 701), multiplying each of the set of n most recent contiguous servo samples by a weighting factor (step 702), summing the set of servo samples to produce a weighted sum (step 703), and determining that a vibration state is detected when the weighted sum exceeds a vibration threshold value (step 704).

In more detail, the receiving step 701 is preferably accomplished by receiving a running set of n most recent contiguous servo samples and the steps of multiplying, summing and determining are performed with respect to successively updated ones of the running plurality of n most recent servo samples. In one implementation, the running analysis is accomplished by storing each of the set of n most recent contiguous servo samples and, for each new servo sample, adding the new servo sample while removing a new-nth servo sample, and producing a new running sum. In an alternative and preferred implementation, the running analysis is accomplished with a circular buffer.

Furthermore, as shown in FIG. 17, the weighting factor preferably increases in magnitude as a function of increasing off-track percentage in order that the running sum increases more rapidly in the presence of a vibration state than the running sum decreases in the absence of a vibration state. In other words, by selecting appropriate weights where further off-track percentages are weighted more heavily than closer off-track percentages, the method rapidly determines that a vibration state exists by rapidly increasing the running sum for large vibratory swings and slowly determines that the vibration state has ceased by slowly decreasing the weighted sum for smaller vibratory swings.

FIG. 18 is an example where 100 servo samples are used to produce the running sum that, with the particular distribution of samples and corresponding weights shown, has a value of 80. If the vibration threshold were established as 50, the running sum of FIG. 18 would cause a determination that the vibration state exists. The method would determine that the vibration state no longer exist if and when the running sum dropped below 50 owing to a succession of samples that are with 7% of track center.

It should be understood that the foregoing methods of determining a vibration state are exemplary in nature only. Any suitable method may be used. It may be possible, for example, to omit the weighting altogether.

We claim:

1. A method of expanding an on-track operational range of a disk drive that is subject to being in a vibration state that is initiated by an external vibration force, wherein the disk drive comprises a control system, the control system using a default on-track-declaration algorithm for analyzing servo samples and determining whether or not a data transfer operation is warranted, the method comprising the steps of:

detecting that the vibration state exists;

modifying the default on-track-declaration algorithm while the existence of the vibration state is detected; and completing the data transfer operation in less time than if the default on-track-declaration algorithm was in use.

2. The method of claim 1 wherein the data transfer operation is a read operation and wherein the on-track-declaration algorithm is a read-related algorithm.

3. The method of claim 1 wherein the data transfer operation is a write operation and wherein the on-track-declaration algorithm is a write-related algorithm.

4. The method of claim 3 wherein the default on-track-declaration algorithm comprises a write-unsafe (WUS) limit that is specified in terms of an off-track percentage that when exceeded in any one servo sample indicates that writing should stop.

5. The method of claim 3 wherein the default on-track-declaration algorithm comprises a write-settle window that is specified in terms of an off-track percentage that when achieved for predetermined number of successive servo samples indicates that writing may start.

6. The method of claim 3 wherein the detecting step is accomplished by directly detecting that the vibration state exists by monitoring a sensor.

7. The method of claim 6 wherein the sensor is an accelerometer.

8. The method of claim 3 wherein the detecting step comprises indirectly detecting that the vibration state exists.

9. The method of claim 8 wherein the detecting step comprises indirectly detecting that the vibration state exists by monitoring a control system metric.

10. The method of claim 9 wherein the control system metric is PES.

11. The method of claim 9 wherein the control system metric is a raw error rate experienced during read operations.

12. The method of claim 9 wherein the control system metric is frequency of ECC correction.

13. The method of claim 9 wherein the detecting step is accomplished by:

receiving a plurality of n most recent servo samples that each correspond to an off-track percentage;

multiplying each of the plurality of n most recent servo samples by a weighting factor;

summing the plurality of n most recent servo samples to produce a weighted sum; and determining that a vibration state is detected when the weighted sum exceeds a vibration threshold value.

14. The method of claim 13 wherein the step of receiving plurality of n most recent servo samples is accomplished by the step of receiving a running plurality of n most recent servo samples and wherein the steps of multiplying, summing and determining are performed with respect to successively updated ones of the running plurality of n most recent servo samples.

15. The method of claim 14 wherein the step of receiving a running plurality of n most recent servo samples is accomplished by storing each of the n most recent servo samples and, for each new servo sample, adding the new servo sample while removing a new-nth servo sample.

16. The method of claim 15 wherein the step of receiving a running plurality of n most recent servo samples is accomplished with a circular buffer.

17. The method of claim 15 wherein the weighting factor increases in magnitude as a function of increasing off-track percentage in order that the weighted sum increases more rapidly in the presence of a vibration state than the weighted sum decreases in the absence of a vibration state.

18. The method of claim 9 wherein the detecting step comprises monitoring a control system metric over a running period of time.

19. The method of claim 18 wherein the detecting step further comprises determining that a vibration state exists when the monitored control system metric exceeds a predetermined threshold value.

20. The method of claim 18 wherein the control system metric is a contiguous servo sample set representative of an off-track percentage.

21. A method of expanding an on-track operational range of a disk drive that is subject to being in a vibration state that is initiated by an external vibration force, wherein the disk drive comprises a control system, the control system using a default on-track-declaration algorithm for analyzing servo samples and determining whether or not a data transfer operation is warranted, the method comprising the steps of:

detecting that the vibration state exists; and modifying the default on-track-declaration algorithm while the existence of the vibration state is detected.

22. The method of claim 20 further comprising the step of completing the data transfer operation in less time than if the default on-track-declaration algorithm was in use.

* * * * *